United States Patent
Hamdan

(10) Patent No.: US 8,781,636 B2
(45) Date of Patent: *Jul. 15, 2014

(54) ROBUST ELECTRIC SCREW COMPRESSOR BLOCKED AIR LINE DETECTION VIA MOTOR CURRENT MONITORING

(75) Inventor: Marv Hamdan, North Olmsted, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 355 days.

This patent is subject to a terminal disclaimer.

(21) Appl. No.: 13/303,203

(22) Filed: Nov. 23, 2011

(65) Prior Publication Data
US 2013/0129527 A1    May 23, 2013

(51) Int. Cl.
  G06F 19/00    (2011.01)
  G05B 9/02     (2006.01)
  H02P 29/00    (2006.01)
  G05D 16/20    (2006.01)

(52) U.S. Cl.
  CPC  *G05B 9/02* (2013.01); *G05D 16/20* (2013.01); *H02P 29/0033* (2013.01)
  USPC ........................................................ 700/282

(58) Field of Classification Search
  CPC ...... H02P 29/0033; G05B 9/02; G05D 16/00; G05D 16/20
  USPC ........................................................ 700/282
  See application file for complete search history.

(56) References Cited

U.S. PATENT DOCUMENTS

| | | | |
|---|---|---|---|
| 3,103,107 A * | 9/1963 | Ehlke ................................. | 62/209 |
| 4,819,123 A * | 4/1989 | Hatimaki .......................... | 361/23 |
| 6,954,683 B2 | 10/2005 | Junk et al. | |
| 7,392,158 B2 * | 6/2008 | Hikawa et al. ................. | 702/185 |
| 7,523,736 B2 * | 4/2009 | Rammer et al. ............... | 123/323 |
| 7,823,397 B2 | 11/2010 | Chang et al. | |
| 2004/0153170 A1 * | 8/2004 | Santacatterina et al. .......... | 700/1 |
| 2009/0109713 A1 * | 4/2009 | Schnetzka et al. ............... | 363/34 |
| 2009/0225479 A1 | 9/2009 | Jayanth et al. | |
| 2011/0141774 A1 * | 6/2011 | Kane et al. ....................... | 363/37 |
| 2013/0255609 A1 * | 10/2013 | Frank et al. ................. | 123/90.14 |
| 2013/0255787 A1 * | 10/2013 | Frank et al. ....................... | 137/1 |

* cited by examiner

*Primary Examiner* — Michael D Masinick
(74) *Attorney, Agent, or Firm* — Fay Sharpe LLP

(57) ABSTRACT

Systems and methods for detecting a blocked air discharge line of an air compressor are described, which include monitoring motor current (IMTR) drawn by a compressor motor, and calculating a three-point moving average for a steady state current drawn by the compressor motor upon the motor reaching steady state (nominal) operating speed. After expiration of a predetermined time period $T_1$ that commences upon the compressor motor reaching steady state speed, a determination is made regarding whether a difference between a current drawn by the compressor motor and the three-point moving average has exceeded a predetermined current value $I_2$ and is consistent with a current profile indicative of a blocked air line. If a blocked air line is detected, a compressor shut-off command is generated and transmitted to the compressor motor to shut the compressor motor off prior to opening of a safety valve on the compressor.

20 Claims, 8 Drawing Sheets
(4 of 8 Drawing Sheet(s) Filed in Color)

US 8,781,636 B2

ROBUST ELECTRIC SCREW COMPRESSOR BLOCKED AIR LINE DETECTION VIA MOTOR CURRENT MONITORING

CROSS-REFERENCE TO RELATED APPLICATIONS

This application contains subject matter related to co-filed U.S. patent application Ser. No. 13/303,234, entitled DETECTION OF BLOCKED AIR LINE FOR ELECTRIC COMPRESSOR AT START UP and filed on Nov. 23, 2011, which is hereby incorporated by reference herein in its entirety.

BACKGROUND

The present application finds particular application in brake systems in vehicles, particularly involving brake systems that include an air compressor. However, it will be appreciated that the described technique may also find application in other brake control systems, other air compressor systems, or other air compressor control systems.

In conventional screw-type compressors, an example of an electrically controlled compressor, a pair of helical screws or rotors is employed to compress a gas, such as air. Oil-filled screw compressors employ a lubricant that fills the space between the rotors. The lubricant provides a hydraulic seal and transfers mechanical energy between the screws. Air enters at a suction side and moves through the threads as the screws rotate. In this manner, the rotors force the air through the compressor until it exits at the end of the screws.

However, conventional air compressors include a safety valve that opens when internal air pressure in the compressor crankcase exceeds a predetermined threshold pressure level. When this occurs, hot crankcase oil and air are sprayed out of the safety valve, causing a mess that requires significant vehicle downtime to clean up, as well as potentially damaging components of the air compressor and/or nearby vehicle components.

One approach monitors DC current of a motor to determine compressor operation. A compressor failure can be predicted through constant monitoring of the current and comparison to a threshold level. Another approach diagnoses a fluid control valve to detect leaks and blockages. The system uses sensors to determine fluid pressure at different locations within the system. When the fluid pressure is out of range, an operator is alerted that a blockage may exist.

Another approach relates to a compressor with a voltage and current monitor. The system monitors the incoming voltage. Through setting and comparing to thresholds, the system can determine whether the compressor has an internal fault or whether the compressor failed due to failure of the supply grid.

The present innovation provides new and improved air discharge line blockage detection systems and methods, which overcome the above-referenced problems and others.

SUMMARY

In accordance with one aspect, a motor controller unit (MCU) that facilitates detecting a blocked air discharge line of an air compressor comprises a processor that executes, and a memory that persistently stores, computer-executable instructions including a motor monitor module that monitors motor current (IMTR) drawn by a compressor motor. The MCU further comprises a blockage detection module that calculates a three-point moving average for a steady state current drawn by the compressor motor, and, after expiration of a predetermined time period $T_1$ that commences upon the compressor motor reaching steady state speed, compares the three-point moving average to the current (IMTR) drawn by the compressor motor to determine whether the current (IMTR) drawn by the compressor motor is consistent with a current profile indicative of a blocked air line. Additionally, the MCU comprise as compressor shut-off module that generates a compressor shut-off command and transmits the shut-off command to the compressor motor to shut the compressor motor off upon detection of the current profile indicative of a blocked air line, in order to shut off the compressor motor prior to opening of a safety valve on the compressor.

In accordance with another aspect, a method of detecting a blocked air discharge line of an air compressor comprising monitoring motor current (IMTR) drawn by a compressor motor, and calculating a three-point moving average for a steady state current drawn by the compressor motor. The method further comprises, after expiration of a predetermined time period $T_1$ that commences upon the compressor motor reaching steady state speed, comparing the three-point moving average to the current (IMTR) drawn by the compressor motor to determine whether the current (IMTR) drawn by the compressor motor is consistent with a current profile indicative of a blocked air line, and generating a compressor shut-off command. Additionally, the method comprises transmitting the shut-off command to the compressor motor to shut the compressor motor off upon detection of the current profile indicative of a blocked air line, in order to shut off the compressor motor prior to opening of a safety valve on the compressor.

In accordance with another aspect, a system that facilitates detecting a blocked air discharge line of an air compressor comprises a motor monitor module that monitors motor current (IMTR) drawn by a compressor motor in an air compressor, and a blockage detection module that calculates a three-point moving average for a steady state current drawn by the compressor motor when the compressor motor reaches steady state speed. The blockage detection module, after expiration of a predetermined time period $T_1$ that commences upon the compressor motor reaching steady state speed, compares the three-point moving average to the current (IMTR) drawn by the compressor motor to determine whether the current (IMTR) drawn by the compressor motor is consistent with a current profile indicative of a blocked air line. The system further comprises a compressor shut-off module that generates a compressor shut-off command and transmits the shut-off command to the compressor motor to shut the compressor motor off upon detection of the current profile indicative of a blocked air line, in order to shut off the compressor motor prior to opening of a safety valve on the compressor.

In accordance with another aspect, an apparatus for detecting a blocked air discharge line of an air compressor comprises monitoring means for monitoring motor current (IMTR) drawn by a compressor motor in an air compressor. The apparatus further comprises blockage detection means for calculating a three-point moving average for a steady state current drawn by the compressor motor when the compressor motor reaches steady state speed, and, after expiration of a predetermined time period $T_1$ that commences upon the compressor motor reaching steady state speed, comparing the three-point moving average to the current (IMTR) drawn by the compressor motor to determine whether the current (IMTR) drawn by the compressor motor is consistent with a current profile indicative of a blocked air line. The apparatus further comprises compressor shut-off means for generating a compressor shut-off command and transmitting the shut-off command to the compressor motor to shut the compressor motor off upon detection of the current profile indicative of a blocked air line, in order to shut off the compressor motor prior to opening of a safety valve on the compressor.

Still further advantages of the subject innovation will be appreciated by those of ordinary skill in the art upon reading and understanding the following detailed description.

BRIEF DESCRIPTION OF THE DRAWINGS

The patent or application file contains at least one drawing executed in color. Copies of this patent or patent application publication with color drawing(s) will be provided by the Patent and Trademark Office upon request and payment of the necessary fee.

The innovation may take form in various components and arrangements of components, and in various steps and arrangements of steps. The drawings are only for purposes of illustrating various aspects and are not to be construed as limiting the invention.

DETAILED DESCRIPTION

Figure 1:
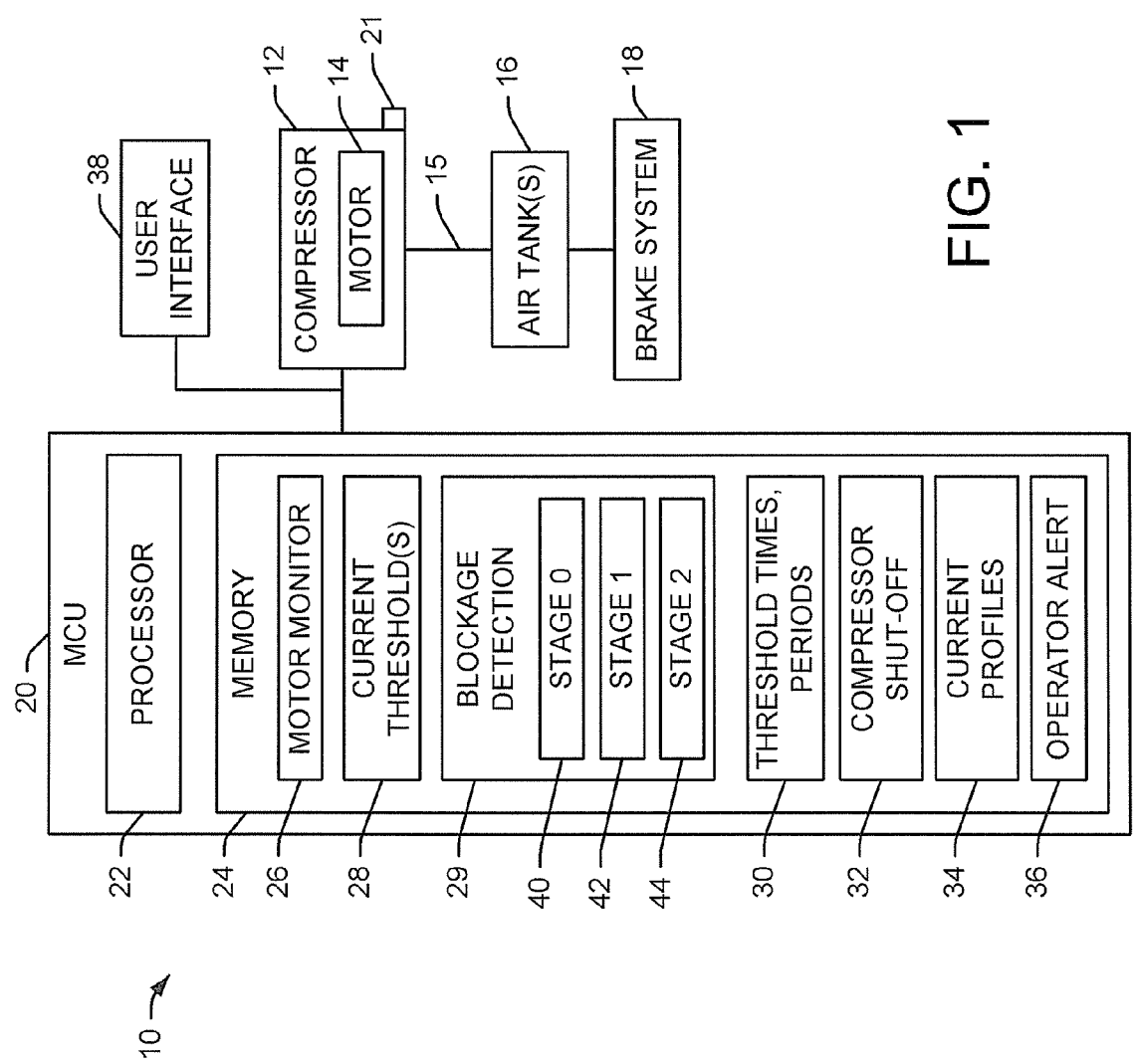
FIG. 1 illustrates a system that facilitates detecting a blocked air line during operation of an electric compressor.

FIG. 1 illustrates a system 10 that facilitates detecting a blocked air line during operation of an electric compressor 12. The current draw of a motor 14 coupled to the electric compressor 12 increases according to a predictable pattern when an air line 15 is blocked downstream of the compressor. The air line 15 delivers air from one or more air tanks 16 that supply compressed air to a brake system 18 and/or one or more other systems in a vehicle, such as a hybrid commercial vehicle or the like. In contrast to conventional approaches, the current drawn by the compressor motor is monitored for a spike indicative of a blocked air line, which is different from the current profile of a failed compressor. Additionally, a need for pressure sensors is mitigated since the described systems and methods use information from the compressor motor to determine if there is a blocked air line.

Blocked air lines on compressor discharge lines are problematic, and can result in significant damage to the compressor 12 or surrounding components. For example, a screw-type compressor (e.g. such as is manufactured by Knorr-Bremse or the like) contains a safety valve that opens when the internal crankcase pressure is too high (e.g., above 200 PSI). Unlike conventional compressors, when this valve opens, air and hot crankcase oil are sprayed through the orifice, which can cause significant down time, as well as damage to the unit or its surroundings. The herein-described systems and methods mitigate the potential for the safety valve to open, and thus the potential for hot crankcase oil to be spewed therefrom, by detecting a current spike indicative of a blocked air discharge line 15 and shutting down the air compressor prior to the safety valve opening. In this manner, air compressor damage that can be caused by the hot crankcase oil spewing from the safety valve orifice is avoided. In addition, the detection is made without a need for extra pressure sensors or mechanical safety valves.

To achieve this, the described systems and methods treat the compressor as a black box and use the information motor current draw information obtained by a motor controller unit (MCU) 20 to detect excessive motor current draw (e.g., RMS current draw, phase current draw, or the like) consistent with internal crankcase pressure build-up indicative of a blocked air discharge line. Once the condition is detected, the MCU generates a transmits to the motor 14 a command to stop spinning the compressor, and a safety valve 21 on the compressor 12 is not triggered because the internal pressure in the compressor is prevented from reaching a threshold pressure at which the safety valve is triggered to open. In this manner, the described systems and methods detect a condition in which the RMS current draw is outside a given envelope during a certain period of time.

To this end, the MCU 20 includes a processor 22 that executes computer-executable instructions, which are persistently stored to a memory or computer-readable medium 24, to perform the various methods, functions, techniques, procedures, etc., described herein. The memory 24 may include volatile, non-volatile memory, solid state memory, flash memory, random-access memory (RAM), read-only memory (ROM), programmable read-only memory (PROM), erasable programmable read-on(y memory (EPROM), electronic erasable programmable read-only memory (EEPROM), variants of the foregoing memory types, combinations thereof, and/or any other type(s) of memory suitable for providing the described functionality and/or storing computer-executable instructions for execution by the processor 22. Additionally, "module," as used herein denotes a set of computer-executable instructions (e.g., a routine, sub-routine, program, application, or the like) that is persistently stored on the computer-readable medium or memory and executed by the processor to perform the various methods, techniques, functions, etc., described herein.

The memory includes a motor monitoring module 26 that monitors RMS current drawn by the compressor motor 14 as well as compressor motor speed. For instance, the monitoring module 26 detects that the motor 14 has been turned on or started, and continues to monitor the motor until the motor reaches steady state speed $S_1$, e.g. 3000 RPM with a current profile envelope from approximately 10 PSI to approximately 110 PSI initial tank pressures in the case of the Knorr-Bremse screw-type compressor described with regard to various illustrative examples presented herein, although other nominal steady state speeds can be used depending on the type of compressor in which the herein-described systems and methods are employed, as will be appreciated by those of skill in the relevant art. For instance, the steady state speed of the compressor motor may be in the range of approximately 2700 RPM to approximately 3200 RPM, or some other suitable RPM range depending on the type of compressor and/or motor in which the system 10 is employed. Upon reaching steady-state speed, motor is in a SPINNING state, and the compressor is just beginning to spin.

The memory also stores one or more current thresholds 28 that are used to determine whether current drawn by the motor is indicative of a blocked air line. The processor executes a blockage detection algorithm or module 29 that evaluates current drawn by the motor 14 at and/or during different predefined times and/or time periods 30 in order to identify the specific current signature that indicates or suggests a blocked air discharge line. In one embodiment, the blockage detection module 29 and its components operate as a state machine that facilitates detecting an air line blockage as a function of motor state. Upon determining that a blockage is present in the air line, the processor executes a compressor shut-off module 32 that initiates and/or ensures compressor shutoff, such as by sending a shut-off command from the MCU 20 to the compressor motor 14. In this manner, a current threshold is calculated when the motor reaches steady state speed, and RMS current drawn by the motor is monitored to detect a current spike or signature that exceeds the current threshold. That is, the current draw profile or signature is monitored to determine whether it is consistent with one or more stored current profiles 34 indicative of a blocked air line. If so, then the compressor is shut off prior to reaching an internal pressure that would trigger the safety valve 21. Additionally, an operator alert module 36 can be executed by the processor 22, which sends an alert to a user interface 38 (e.g., an on-board computer, a user interface in the cab of the vehicle, or the like) to alert the operator that the compressor has been shut down and/or that air discharge line 15 is blocked.

The blockage detection module 29 includes a stage 0 module 40 that evaluates various motor parameters (e.g., speed, current draw, etc.) and calculates a 3-point moving average for current drawn by the motor at steady state speed upon determining that the motor has reached steady state speed. The stage 0 module "locks in" the motor steady state speed by setting it equal to the 3-point moving average (e.g., for purposes of current threshold limit calculation), and multiplies the 3-point moving average speed by a limit factor (e.g., 1.25 or some other predetermined limit factor) to generate the motor current threshold or limit 28. In one embodiment, the limit factor is in the range of 1.1 to 1.4. In general, the limit factor can be any value greater than 1.0. This current threshold is subsequently used to identify motor current draw deviations indicative of a blocked air line.

The blockage detection module 29 also includes a stage 1 module 42 that further evaluates motor current (IMTR) as a function of time, once the stage 0 module 40 has locked in the steady state motor current and calculated the current threshold. The stage 1 module 42 determines whether a predetermined time period $T_1$ (e.g., 3 seconds or some other predetermined time period) has elapsed since the compressor motor reached steady state speed. In one embodiment, the predetermined time period is in the range of approximately 1 second to approximately 4 seconds. If the predetermined time period has elapsed, then the stage 1 module 42 hands off motor monitoring duties to a stage 2 module 44. If the predetermined time period has not elapsed, then the stage 1 module determines whether the difference between the measured motor current IMTR and the current threshold (IMTR_LIMIT) 28 is less than a first predetermined current value (e.g., 1A or some other suitable predetermined current value). If not, then the stage 1 module continues to monitor the motor current IMTR until the predetermined time period $T_1$ has elapsed. To further this example, if the difference between the motor current draw IMTR and the current threshold IMTR_LIMIT 28 is greater than 1A, then the stage 1 module determines whether a slope of the motor current draw profile is greater than a first predetermined slope value (e.g., 200 or some other suitable slope value). In one embodiment, the predetermined slope value is in the range of 100 to 300, although it may be higher or lower. If so, then the current drawn by the motor is spiking and the stage 2 module determines that a blocked air line is present and invokes the compressor shutoff module 32 to shut off the compressor and to prevent the compressor safety valve 21 from opening spewing hot compressor crankcase oil.

Once the predetermined time period $T_1$ has elapsed, the stage 2 module 44 takes over evaluation of motor current (IMTR) as a function of time. The stage 2 module determines whether a difference between the 3-point moving average current (calculated by the stage 0 module) and a measured steady state current (which is continuously or periodically measured by the motor monitor) is greater than a second predetermined current value, which may be the same as the first predetermined current value (e.g., 1A in the above example) or any other suitable predetermined current value. In one embodiment, the first predetermined current value is selected to be in the rage of 0.5A to 2.0A, although it may be lower or higher as a function of compressor type or size, motor type or size, etc. If so, then the stage 2 module determines whether a slope of the motor current draw profile is greater than a second predetermined slope value, which may be the same as the first predetermined slope value (e.g., 200 in the foregoing example) or some other suitable slope value. If so, then the current drawn by the motor is spiking and the stage 2 module determines that a blocked air line is present and invokes the compressor shutoff module 32 to shut off the compressor and to prevent the compressor safety valve 21 from opening spewing hot compressor crankcase oil.

If either of the foregoing conditions is not present, the stage 2 module 44 determines whether the absolute value of the IMTR current profile slope is less than a third predetermined slope value (e.g., 50 or some other suitable slope value). If not, then the stage 2 module continues to monitor and evaluate the motor current. If so, then the steady state current drawn by the motor is updated to be equal to the 3-point moving average current.

The blockage detection algorithm or state machine executed via the blockage detection module 29 is exemplified by the following pseudocode snippet, wherein comments are indicated by a double forward slash ("//"):

```
IDLE:
    if (state_of_motor = SPINNING) then state = Lock-in_IMTR
Lock-in_IMTR:
    //Stage0
    if ((desired speed – actual speed) < 100 RPM)
    then
        limit_IMTR_100ms_25pct = IMTR_AVG_mAmps_k + 25%
        IMTR_100ms_steady_state = IMTR_3pt_avg
        state = STAGE1
    end
STAGE1:
    if (timer < 3 seconds)
    then
        //Stage1 test:
        if ((diff IMTR_and_25pct_limit > 1000) AND
            (blocked_current_slope_RMS > 200))
        then blocked_air_line = TRUE;
    else
        state = STAGE2
STAGE2:
    //Stage2 test:
    if ((diff_IMTR_3pt_avg_and_steady_state > 1000) AND
        (blocked_current_slope_RMS > 200) )
    then blocked_air_line = TRUE;
    //update the steady-state current param, if IMTR_3pt_avg and steady-
```

```
//current is small
if (abs (blocked_current_slope_RMS) <= 50)
then
    //update steady state current with 3 point moving average
    IMTR_100ms_steady_state = IMTR_100ms_3pt_avg;
end
```

The following pseudocode is provided by way of example and not limitation to illustrate the timing of the blocked air line detection algorithm executed by the blockage detection module 29, with comment lines in the pseudocode indicated by a double forward slash ("//").

```
at 1 msec:
//for Stage1 and Stage2 tests - accumulate IMTR_slope_RMS at 1KHz to indicate
//if instantaneous current is deviating from 3 point average at 10 Hz
Δ = IMTR_AVG_mAmps_k - IMTR_100ms_3pt_avg;
blocked_current_slope_RMS_accum = blocked_current_slope_RMS_accum + Δ;
Accum_counts = Accum_counts + 1;
at 100 msec:
//calculate 3 point moving average _10 Hz filtered form of IMTR RMS current
IMTR_100ms_k_2 = IMTR_100ms_k_1;
IMTR_100ms_k_1 = IMTR_100ms_k;
IMTR_100ms_k = lIMTR_AVG_mAmps_k;
IMTR_100ms_3pt_avg = (IMTR_100ms_k_2 + IMTR_100ms_k_1 +
    IMTR_100ms_k) ÷ 3;
//for stage 1 test --- calculate how far IMTR is from 25% threshold
diff_IMTR_and_25pct_limit = lIMTR_AVG_mAmps_k -
    limit_IMTR_100ms_25pct;
//for stage 2 test --- calculate how far 3 point average is away from
//steady_state_current
diff_IMTR_3pt_avg_and_steady_state = IMTR_100ms_3pt_avg -
    IMTR_100ms_steady_state;
//update the state machine for diagnostics, and in state=STAGE2, if
//IMTR_slope_RMS is small, then set steady state current equal to IMTR 3 point
//average
call update_BLOCKED_check_state_machine( );
at 500 msec:
//average all readings taken over last 500 msec (1 msec sampling)_accum /
//accum_counts
blocked_current_slope RMS = [Σ (IMTR_AVG_mAmps_k -
    IMTR_100ms_3pt_avg] ÷ Accum counts;
blocked_current_slope_RMS = blocked_current_slope_RMS_accum ÷
    Accum_counts;
```

It will be understood that the various values (e.g., times, current values, slopes, limit percentages, etc.) set forth in the foregoing pseudocode snippets are provided by way of example for illustrative purposes, and are not to be construed in a limiting sense.

Figure 2:
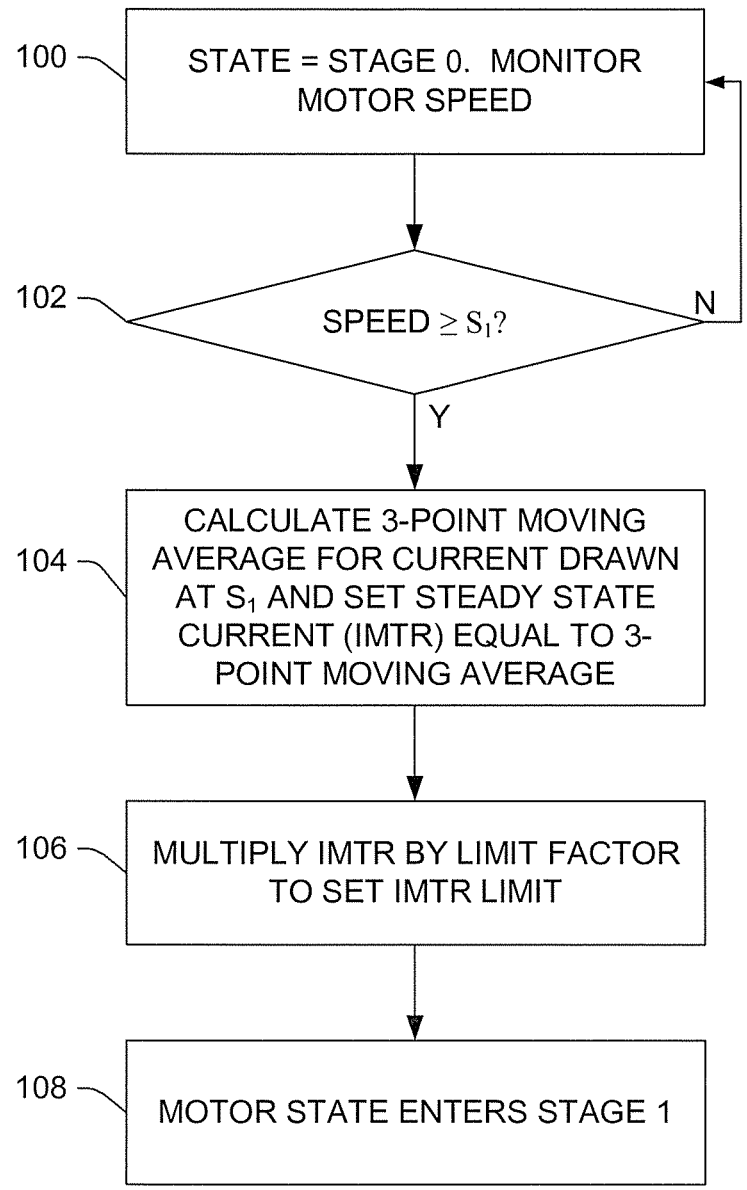
FIG. 2 illustrates a method such as is performed by the MCU and/or the processor when executing the stage 0 module.
Figure 3:
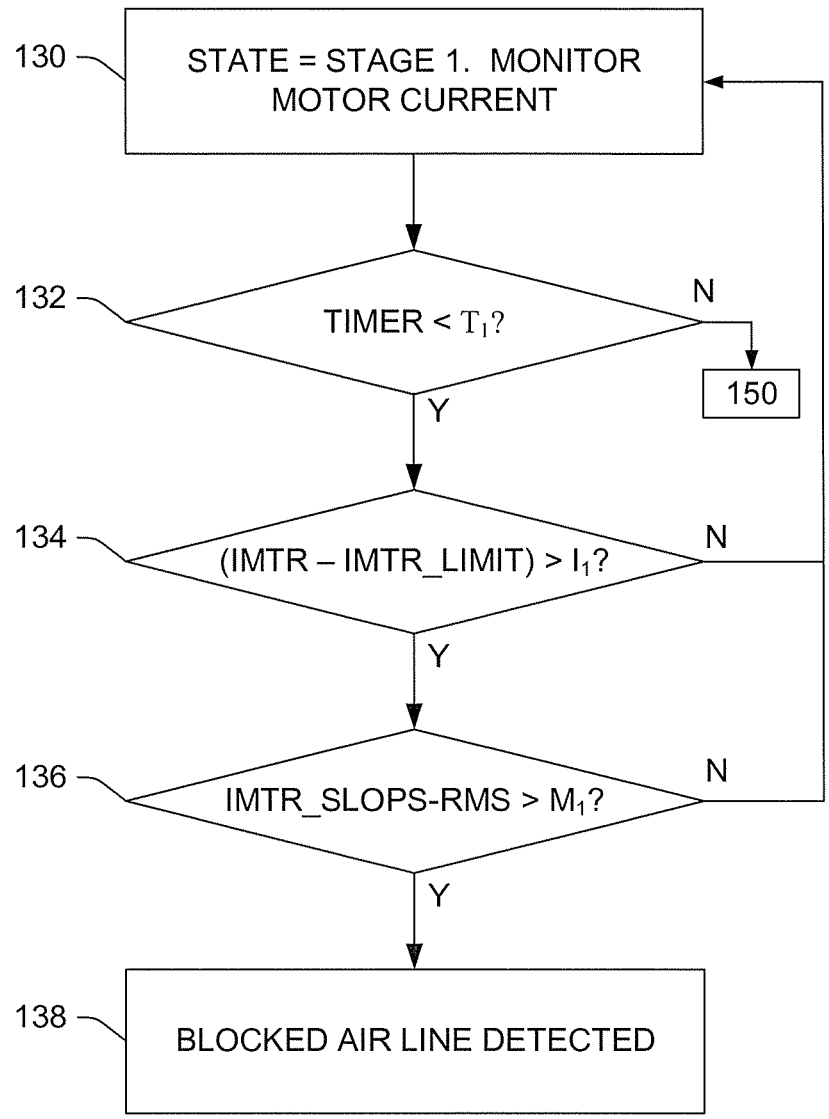
FIG. 3 illustrates a method that evaluates motor current (IMTR) as a function of time, once the compressor motor enters stage 1.
Figure 4:
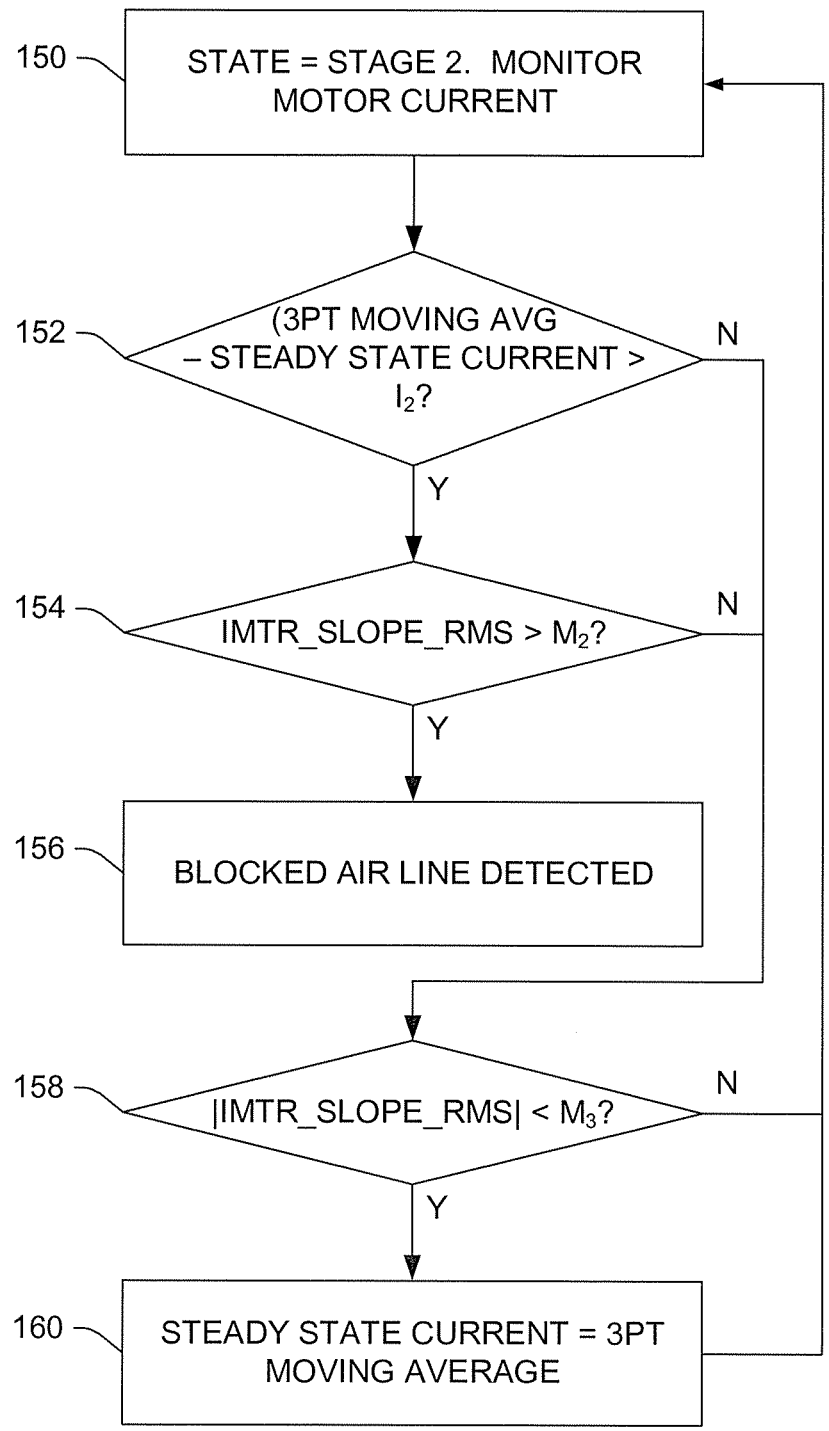
FIG. 4 illustrates a method for detecting a blocked air line after the predetermined time period $T_1$ has elapsed, wherein the motor current IMTR is monitored as a function of time.

FIGS. 2-4 illustrate methods such as may be performed by the system of FIG. 1. FIG. 2 illustrates a method such as is performed by the MCU 20 and/or the processor 22 when executing the stage 0 module 40. At 100, the compressor motor state is in "stage 0", which indicates that startup has occurred and the motor (14) is ramping up to steady state speed. Motor speed is monitored. At 102, a determination is made regarding whether the motor has reached steady state (i.e., nominal) operating speed $S_1$ (e.g., 3000 RPM or some other nominal operating speed). If not, then the method reverts to 100 for continued monitoring. If the compressor motor has reached steady state speed $S_1$, then at 104, a 3-point moving average for current drawn by the motor at steady state speed is calculated upon determining that the motor has reached steady state speed, and the motor steady state speed (IMTR) is set equal to the 3-point moving average (e.g., for purposes of current threshold limit calculation). At 106, IMTR is multiplied by a limit factor (e.g., 1.25 or some other predetermined limit factor) to generate the motor current threshold or limit (IMTR_LIMIT). This current threshold is subsequently used to identify motor current draw deviations indicative of a blocked air line. At 108, the motor state enters "stage 1."

FIG. 3 illustrates a method that evaluates motor current (IMTR) as a function of time, once the compressor motor enters stage 1, at 130. At 132, a determination is made regarding whether a predetermined time period $T_1$ (e.g., 3 seconds or some other predetermined time period) has elapsed since the compressor motor reached steady state speed. If the predetermined time period has elapsed, then the motor is determined to have entered state 2 and the method proceeds to 150 (FIG. 4). If the predetermined time period has not elapsed, then at 134 a determination is made regarding whether the difference between the measured motor current IMTR and the current threshold (IMTR_LIMIT) 28 is less than a first predetermined current value $I_1$ (e.g., 1A or some other suitable predetermined current value). If not, then the method reverts to 130 for continued motor current monitoring until the predetermined time period $T_1$ has elapsed. If the difference between the motor current draw IMTR and the current threshold IMTR_LIMIT 28 is greater than the first predetermined current value, then at 136 a determination is made regarding whether a slope of the motor current draw profile is greater than a first predetermined slope value $M_1$ (e.g., 200 or some other suitable slope value). If so, then the current drawn by the motor is spiking and a determination is made at 138 that a blocked air line is present. At this point, a signal is sent to the compressor motor to shut down to prevent the compressor safety valve 21 from opening spewing hot compressor crankcase oil.

FIG. 4 illustrates a method for detecting a blocked air line after the predetermined time period $T_1$ has elapsed, wherein the motor current IMTR is monitored as a function of time, at 150. At 152, a determination is made regarding whether a difference between the 3-point moving average current (calculated by the stage 0 module) and a measured steady state current (which is continuously or periodically measured by the motor monitor) is greater than a second predetermined current value $I_2$, which may be the same as the first predetermined current value $I_1$ (e.g., 1A in the above example) or any other suitable predetermined current value. If so, then at 154 a determination is made regarding whether a slope of the motor current draw profile is greater than a second predetermined slope value $M_2$, which may be the same as the first predetermined slope value $M_1$ (e.g., 200 in the foregoing example) or some other suitable slope value. If so, then at 156, a determination is made that a blocked air line is present. At this point a signal is sent to shut off the compressor and to prevent the compressor safety valve 21 from opening spewing hot compressor crankcase oil.

If either of the conditions evaluated at 152 ($I_2$) and 154 ($M_2$) is not true, then at 158 a determination is made regarding whether the absolute value of the IMTR current profile slope is less than a third predetermined slope value $M_3$ (e.g., 50 or some other suitable slope value). If not, then the method reverts to 150 for continued monitoring of the compressor motor current. If so, then the steady state current drawn by the motor is updated to be equal to the 3-point moving average current.

Figure 5:
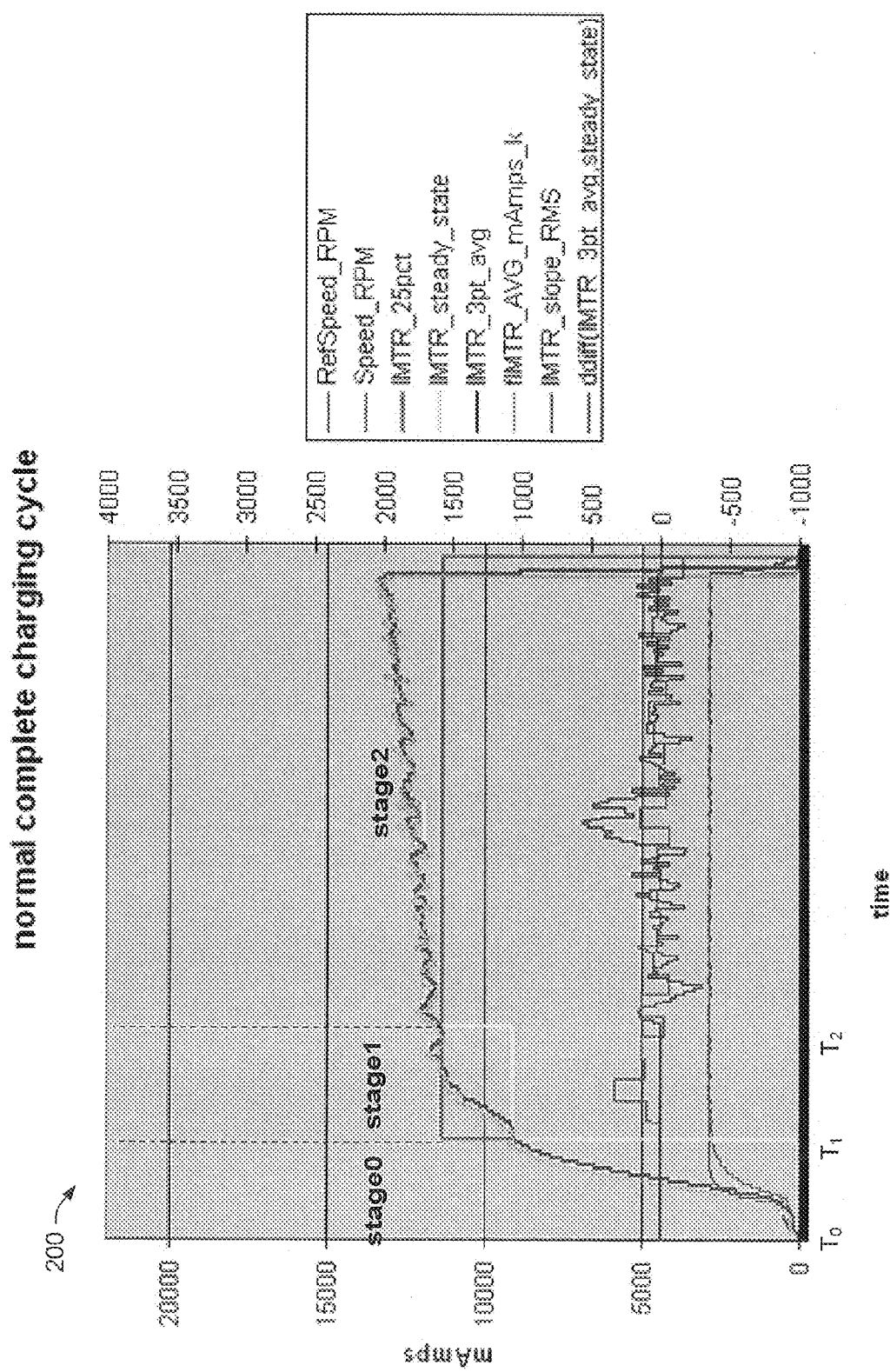
FIG. 5 shows a screenshot of a current profile during stage 0, stage 1, and stage 2 of compressor motor operation.

FIG. 5 shows a screenshot of a current profile 200 during stage 0, stage 1, and stage 2 of compressor motor operation. The steady state current (IMTR) of the compressor motor (shown by the yellow line in the profile 200) is locked in at $T_1$, when the motor has reached steady state speed and transitions from stage 0 to stage 1.

Figure 6:
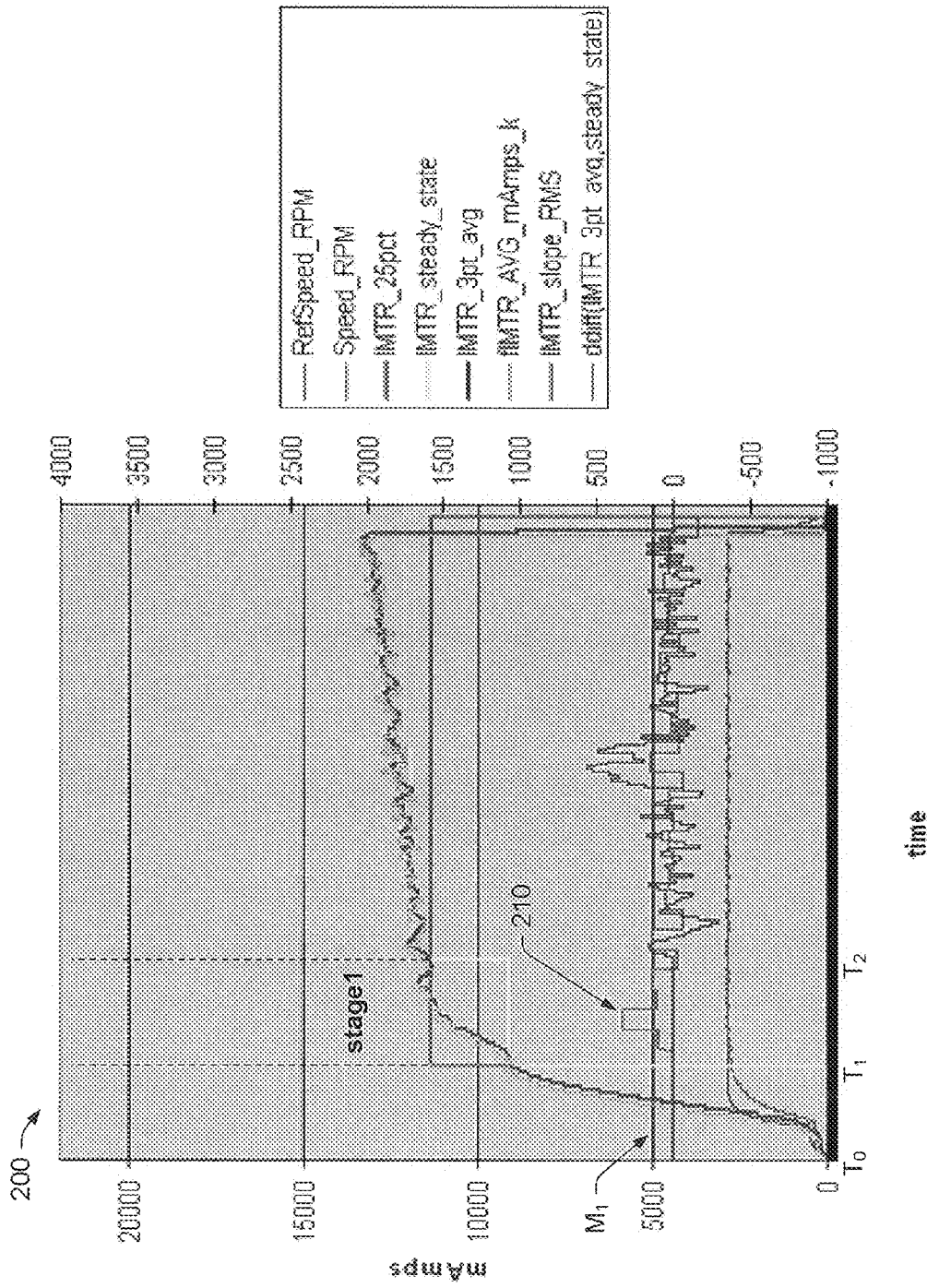
FIG. 6 shows a screenshot of the current profile in which the compressor motor RMS current slope exceeds the stage 1 slope threshold $M_1$.

FIG. 6 shows a screenshot of the current profile 200 in which the compressor motor RMS current slope 210 (dark blue line) exceeds the stage 1 slope threshold $M_1$ (black line) which indicates that the motor current IMTR is not tracking the 3-point moving average.

Figure 7:
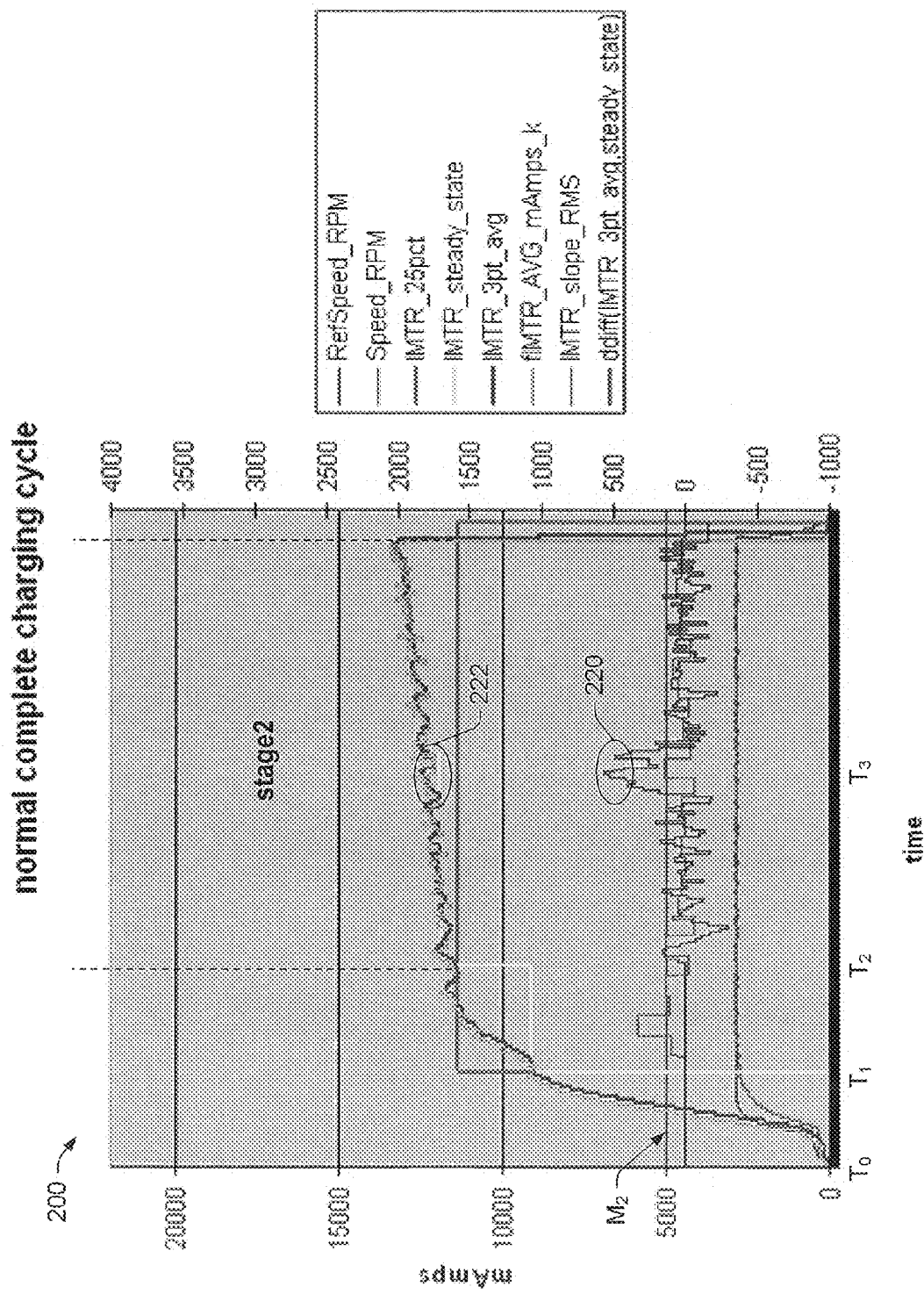
FIG. 7 shows a screenshot of the current profile in which the compressor motor RMS current slope exceeds the stage 2 slope threshold $M_2$.

FIG. 7 shows a screenshot of the current profile 200 in which the compressor motor RMS current slope 220 (dark blue line) exceeds the stage 2 slope threshold $M_2$ (black line), which indicates that the motor current IMTR is not tracking the 3-point moving average. The difference 222 between the IMTR steady state current (yellow line) and the IMTR 3-point moving average (purple line) is not greater than a threshold current value $I_2$ (e.g., 0.5A or some other predetermined threshold current value). Thus, of the conditions described at 152 and 154 (FIG. 4), only one is true such that the current profile 200 is not indicative of a blocked air line in this case.

Figure 8:
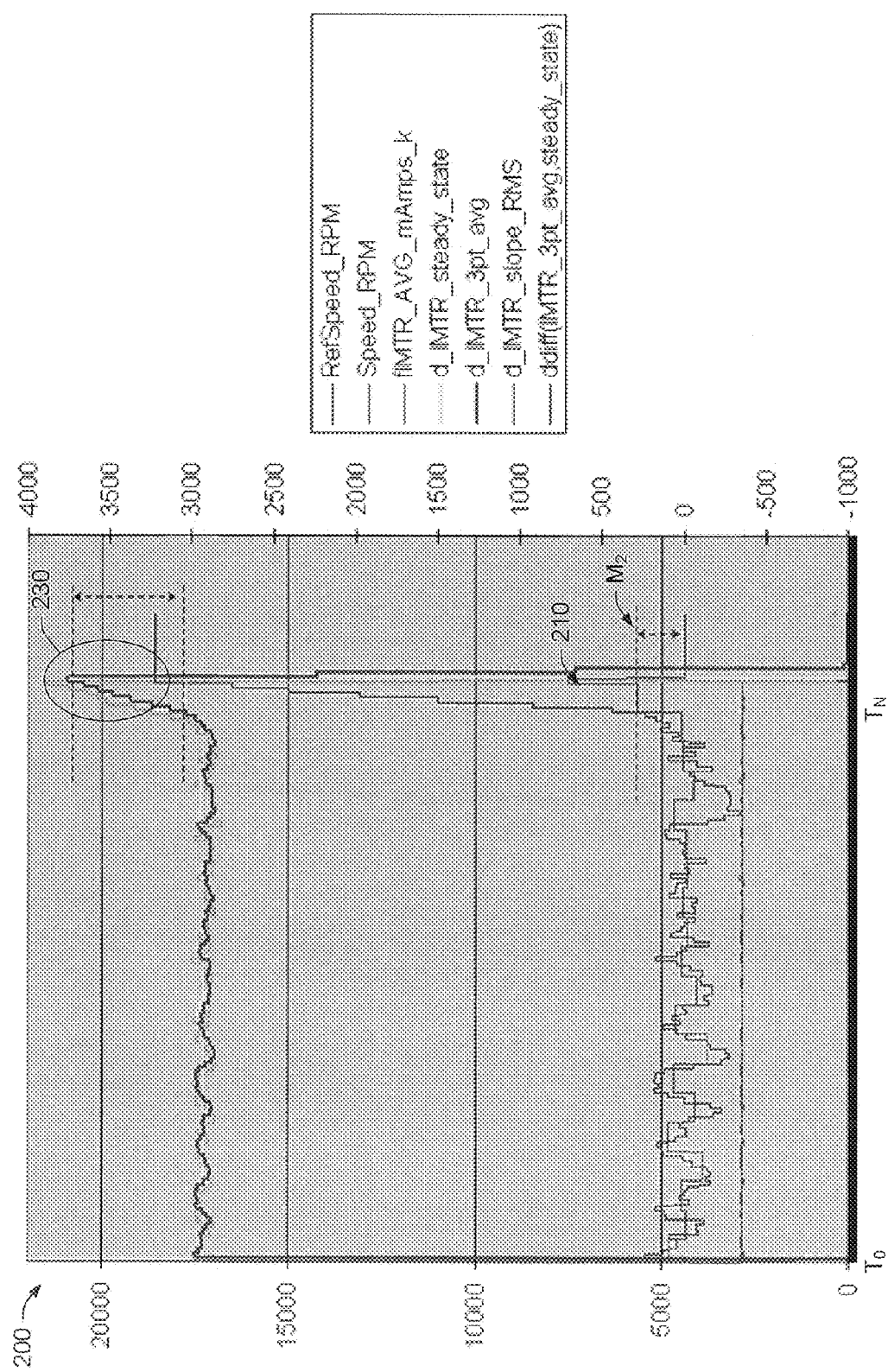
FIG. 8 shows a screenshot of the current profile in which the compressor motor RMS current slope exceeds the stage 2 slope threshold $M_2$ at time $T_N$

FIG. 8 shows a screenshot of the current profile 200 in which the compressor motor RMS current slope 210 (dark blue line) exceeds the stage 2 slope threshold $M_2$ (black line) at time $T_N$, which indicates that the motor current IMTR is not tracking the 3-point moving average. The difference 230 between the IMTR steady state current (yellow line) and the IMTR 3-point moving average (purple line) at time $T_N$ is greater than a threshold current value $I_2$ (e.g., 0.5A or some other predetermined threshold current value). Thus, both of the conditions described at 152 and 154 (FIG. 4) are true such that the current profile 200 is indicative of a blocked air line in this case. At this point, the MCU of FIG. 1 can send a shut off command to the air compressor motor. Additionally, an operator of the vehicle in which the system of FIG. 1 is employed can be provided with an alert that the air compressor is shutting down (e.g., via a dashboard indicator, a graphical user interface, or the like). The foregoing systems and methods mitigate a need for mechanical safety valves and pressure sensors that monitor internal crankcase pressure in the air compress.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A motor controller unit (MCU) (20) that facilitates detecting a blocked air discharge line of an air compressor, comprising:
    a processor (22) that executes, and a memory (24) that persistently stores, computer-executable instructions including:
        a motor monitor module (26) that monitors motor current (IMTR) drawn by a compressor motor (14);
        a blockage detection module (29) that:
            calculates a three-point moving average for a steady state current drawn by the compressor motor (14); and
            after expiration of a predetermined time period $T_1$ that commences upon the compressor motor (14) reaching steady state speed, compares the three-point moving average to the current (IMTR) drawn by the compressor motor (14) to determine whether the current (IMTR) drawn by the compressor motor (14) is consistent with a current profile (34) indicative of a blocked air line (15); and
        a compressor shut-off module (32) that generates a compressor shut-off command and transmits the shut-off command to the compressor motor (14) to shut the compressor motor off upon detection of the current profile (34) indicative of a blocked air line (15), in order to shut off the compressor motor (14) prior to opening of a safety valve (21) on the compressor (12).

2. The motor controller unit according to claim 1, wherein the blockage detection module calculates the three-point moving average when the compressor motor (14) reaches steady state speed.

3. The motor controller unit according to claim 1, wherein, in order to determine that the current drawn by the compressor motor (14) is consistent with a current profile (34) indicative of a blocked air line (15), the blockage detection module (29) determines whether a difference between the current (IMTR) drawn by the compressor motor (14) and the three-point moving average is greater than a predetermined current value $I_2$.

4. The motor controller unit according to claim 3, wherein the blockage detection module (29) determines whether a slope of the current (IMTR) drawn by the compressor motor (14) is greater than a first predetermined slope value.

5. The motor controller unit according to claim 4, wherein the blockage detection module (29), upon determining that the difference between the current (IMTR) drawn by the compressor motor (14) and the three-point moving average is greater than the predetermined current value $I_2$ and that the slope of the current (IMTR) drawn by the compressor motor (14) is greater than the first predetermined slope value, concludes that the current (IMTR) drawn by the compressor motor (14) is consistent with the current profile (34) indicative of a blocked air line (15).

6. The motor controller unit according to claim 4, wherein if at least one of:
    the slope of the current (IMTR) drawn by the compressor motor (14) is not greater than the predetermined slope value; and
    the difference between the current (IMTR) drawn by the compressor motor (14) and the three point moving average is not greater than the predetermined current value $I_2$;

the blockage detection module (29) determines whether the slope of the current (IMTR) drawn by the compressor motor (14) is less than a second predetermined slope value that is less than the first predetermined slope value;

wherein if the slope of the current (IMTR) drawn by the compressor motor (14) is less than the second predetermined slope value, the steady state current is determined to be consistent with the three-point moving average; and wherein if the slope of the current (IMTR) drawn by the compressor motor (14) is not less than the second predetermined slope value, the blockage detection module (29) reevaluates the steady state current relative to the three-point moving average and reevaluates the slope of the current (IMTR) drawn by the compressor motor (14).

7. The motor controller unit according to claim 4, wherein at least one of:

the predetermined time period is in the range of 1 second to 4 seconds;

the predetermined current value $I_2$ is in the range of 0.5A to 2A; and the predetermined slope is in the range of 100 to 300.

8. A method of detecting a blocked air discharge line of an air compressor, comprising:

monitoring motor current (IMTR) drawn by a compressor motor (14);

calculating a three-point moving average for a steady state current drawn by the compressor motor (14);

calculating a current threshold (IMTR_LIMIT) (28) as a function of the three-point moving average;

after expiration of a predetermined time period $T_1$ that commences upon the compressor motor (14) reaching steady state speed, comparing the three-point moving average to the current (IMTR) drawn by the compressor motor (14) to determine whether the current (IMTR) drawn by the compressor motor (14) is consistent with a current profile (34) indicative of a blocked air line (15);

generating a compressor shut-off command; and transmitting the shut-off command to the compressor motor (14) to shut the compressor motor off upon detection of the current profile (34) indicative of a blocked air line (15), in order to shut off the compressor motor (14) prior to opening of a safety valve (21) on the compressor (12).

9. The method according to claim 8, further comprising calculating the three-point moving average when the compressor motor (14) reaches steady state speed.

10. The method according to claim 8, wherein, in order to determine that the current drawn by the compressor motor (14) is consistent with a current profile (34) indicative of a blocked air line (15), the method further comprises determining whether a difference between the current (IMTR) drawn by the compressor motor (14) and the three-point moving average is greater than a predetermined current value $I_2$.

11. The method according to claim 10, further comprising determining whether a slope of the current (IMTR) drawn by the compressor motor (14) is greater than a predetermined slope value.

12. The method according to claim 11, further comprising, upon determining that the difference between the current (IMTR) drawn by the compressor motor (14) and the three-point moving average is greater than the predetermined current value $I_2$, and that the slope of the current (IMTR) drawn by the compressor motor (14) is greater than the predetermined slope value, concluding that the current (IMTR) drawn by the compressor motor (14) is consistent with the current profile (34) indicative of a blocked air line (15).

13. The method according to claim 11, wherein if at least one of:

the slope of the current (IMTR) drawn by the compressor motor (14) is not greater than the predetermined slope value; and the difference between the current (IMTR) drawn by the compressor motor (14) and the three point moving average is not greater than the predetermined current value $I_2$;

the method further comprises determining whether the slope of the current (IMTR) drawn by the compressor motor (14) is less than a second predetermined slope value that is less than the first predetermined slope value;

wherein if the slope of the current (IMTR) drawn by the compressor motor (14) is less than the second predetermined slope value, the steady state current is determined to be consistent with the three-point moving average; and wherein if the slope of the current (IMTR) drawn by the compressor motor (14) is not less than the second predetermined slope value, the method comprises reevaluating the steady state current relative to the three-point moving average and reevaluating the slope of the current (IMTR) drawn by the compressor motor (14).

14. The method according to claim 10, wherein at least one of:

the predetermined time period is in the range of 1 second to 4 seconds;

the predetermined current value $I_2$ is in the range of 0.5A to 2A and the predetermined slope is in the range of 100 to 300.

15. A system that facilitates detecting a blocked air discharge line of an air compressor, comprising:

a motor monitor module (26) that monitors motor current (IMTR) drawn by a compressor motor (14) in an air compressor;

a blockage detection module (29) that:

calculates a three-point moving average for a steady state current drawn by the compressor motor (14); and after expiration of a predetermined time period $T_1$ that commences upon the compressor motor (14) reaching steady state speed, compares the three-point moving average to the current (IMTR) drawn by the compressor motor (14) to determine whether the current (IMTR) drawn by the compressor motor (14) is consistent with a current profile (34) indicative of a blocked air line (15); and a compressor shut-off module (32) that generates a compressor shut-off command and transmits the shut-off command to the compressor motor (14) to shut the compressor motor off upon detection of the current profile (34) indicative of a blocked air line (15), in order to shut off the compressor motor (14) prior to opening of a safety valve (21) on the compressor (12).

16. The system according to claim 15, wherein the three-point moving average is calculated upon the compressor motor (14) reaching steady state speed.

17. The system according to claim 15, wherein, in order to determine that the current drawn by the compressor motor (14) is consistent with a current profile (34) indicative of a blocked air line (15), the blockage detection module (29):

determines whether a difference between the current (IMTR) drawn by the compressor motor (14) and the three-point moving average is greater than a predetermined current value $I_2$;

determines whether a slope of the current (IMTR) drawn by the compressor motor (14) is greater than a predetermined slope value; and upon determining that the difference between the current (IMTR) drawn by the compressor motor (14) and the three-point moving average is greater than the predetermined current value $I_2$ and that the slope of the current (IMTR) drawn by the compressor motor (14) is greater than the predetermined slope value, concludes that the current (IMTR) drawn by the compressor motor (14) is consistent with the current profile (34) indicative of a blocked air line (15).

18. The system according to claim 17, wherein if at least one of:

the slope of the current (IMTR) drawn by the compressor motor (14) is not greater than the predetermined slope value; and the difference between the current (IMTR) drawn by the compressor motor (14) and the three point moving average is not greater than the predetermined current value $I_2$;

the blockage detection module (29) determines whether the slope of the current (IMTR) drawn by the compressor motor (14) is less than a second predetermined slope value that is less than the first predetermined slope value;

wherein if the slope of the current (IMTR) drawn by the compressor motor (14) is less than the second predetermined slope value, the steady state current is determined to be consistent with the three-point moving average; and if the slope of the current (IMTR) drawn by the compressor motor (14) is not less than the second predetermined slope value, the blockage detection module (29) reevaluates the steady state current relative to the three-point moving average and reevaluates the slope of the current (IMTR) drawn by the compressor motor (14).

19. The system according to claim 17, wherein at least one of:

the predetermined time period is in the range of 1 second to 4 seconds;

the predetermined current value $I_2$ is in the range of 0.5A to 2A; and the predetermined slope is in the range of 100 to 300.

20. An apparatus for detecting a blocked air discharge line of an air compressor, comprising:

monitoring means (20, 22, 24, 26) for monitoring motor current (IMTR) drawn by a compressor motor (14) in an air compressor;

blockage detection means (20, 22, 24, 29) for:

calculating a three-point moving average for a steady state current drawn by the compressor motor (14) when the compressor motor (14) reaches steady state speed; and after expiration of a predetermined time period $T_1$ that commences upon the compressor motor (14) reaching steady state speed, comparing the three-point moving average to the current (IMTR) drawn by the compressor motor (14) to determine whether the current (IMTR) drawn by the compressor motor (14) is consistent with a current profile (34) indicative of a blocked air line (15);

compressor shut-off means (20, 22, 24, 32) for generating a compressor shut-off command and transmitting the shut-off command to the compressor motor (14) to shut the compressor motor off upon detection of the current profile (34) indicative of a blocked air line (15), in order to shut off the compressor motor (14) prior to opening of a safety valve (21) on the compressor (12).

\* \* \* \* \*